United States Patent
Beeson

[19]

[11] Patent Number: 6,121,895
[45] Date of Patent: Sep. 19, 2000

[54] METHOD AND APPARATUS FOR WARNING OF DRIVING ON A POTENTIALLY DANGEROUS ROAD SURFACE BY USING THE RATIO OF WHEEL SPEEDS

[75] Inventor: Michael James Beeson, Sutton Coldfield, United Kingdom

[73] Assignee: Sumitomo Rubber Industries, Hyogo-Ken, Japan

[21] Appl. No.: 09/452,805

[22] Filed: Dec. 2, 1999

[30] Foreign Application Priority Data

Dec. 22, 1998 [GB] United Kingdom ................... 9828157

[51] Int. Cl.⁷ ....................................................... G08G 1/00
[52] U.S. Cl. ........................ 340/901; 340/905; 340/444; 364/550; 364/424.05
[58] Field of Search ..................................... 340/901, 905, 340/442, 444; 701/82; 364/550, 424.05

[56] References Cited

U.S. PATENT DOCUMENTS

| | | | |
|---|---|---|---|
| 4,651,290 | 3/1987 | Masaki et al. ........................... | 364/550 |
| 4,809,197 | 2/1989 | Tashiro et al. .......................... | 364/550 |
| 5,034,890 | 7/1991 | Sugasawa et al. .................. | 364/424.05 |
| 5,444,621 | 8/1995 | Matsunaga et al. ................ | 364/424.05 |
| 5,719,565 | 7/1996 | Tsuno et al. ............................. | 340/905 |
| 5,765,119 | 6/1998 | Otabe et al. ............................... | 701/82 |
| 5,774,070 | 6/1998 | Rendon ................................... | 340/905 |

*Primary Examiner*—Daniel J. Wu
*Assistant Examiner*—Phung Nguyen
*Attorney, Agent, or Firm*—Birch, Stewart, Kolasch & Birch, LLP

[57] ABSTRACT

A method of warning a vehicle driver when the vehicle may be driving on a potentially hazardous road surface, the vehicle having a wheel or wheels at front left and right and rear left and right positions on the vehicle, comprising repeating the steps of measuring the instantaneous speed of the wheel or wheels at each of the four positions, calculating the ratio of the speeds of the wheels on the left and the ratio of the speeds of the wheels on the right and deriving and storing the difference between these ratios, comparing the current difference with the previously stored difference and in the event that the absolute value of the comparison between the differences exceeds a predetermined value issuing an alarm to the driver that the road surface may have varying frictional characteristics.

8 Claims, 1 Drawing Sheet

METHOD AND APPARATUS FOR WARNING OF DRIVING ON A POTENTIALLY DANGEROUS ROAD SURFACE BY USING THE RATIO OF WHEEL SPEEDS

BACKGROUND OF THE INVENTION

1. Field of the Invention

The present invention relates to a method and apparatus for warning a vehicle driver of a potentially dangerous road surface.

2. Description of Related Art

A good road surface in the context of the present invention is one that has good- frictional characteristics with the rubbers of tire treads and furthermore one which has consistent or unvarying frictional characteristics over its surface In contrast a poor road surface is one which has inconsistent or varying frictional characteristics having areas of lower friction such as may be due to a variable composition or loose surface or the presence of pools of water, patches of mud or ice or spillages of oil. Under many conditions such as in the dark or in the presence of black ice drivers may be completely ignorant of the quality of the road surface on which they are travelling. Such poor road surfaces are potentially hazardous for drivers in that they may present different levels of friction to different wheels of the vehicle rendering the response of the vehicle unpredictable.

SUMMARY OF THE INVENTION

It is an object of the present invention to provide a system comprising method and apparatus to warn the vehicle driver of such potentially dangerous road surfaces.

According to a first aspect of the invention there is provided a method of warning a vehicle driver when the vehicle may be driving on a potentially hazardous road surface, the vehicle having a wheel or wheels at front left and right and rear left and right positions on the vehicle, comprising repeating the steps of measuring the instantaneous speed of the wheel or wheels at each of the four positions, calculating the ratio of the speeds of the wheels on the left and the ratio of the speeds of the wheels on the right and deriving and storing the difference between these ratios, comparing the current difference with the previously stored difference and in the event that the absolute value of the comparison between the differences exceeds a predetermined value issuing an alarm to the driver that the road surface may have varying frictional characteristics.

Preferably the steps of measuring, calculating, deriving, storing and comparing are repeated at least every second.

The wheel speeds may be measured by means of signals provided by pulse generators provided at each wheel such as are frequently used in electronic anti-lock braking systems fitted to many modern vehicles According to a second aspect of the invention there is provided an apparatus for warning a vehicle driver when the vehicle may be driving on a potentially hazardous road surface, the vehicle having a wheel or wheels at front left and right and rear left and right positions on the vehicle, comprising means for measuring the instantaneous speed of the wheel or wheels at each of the four positions, means for calculating the ratio of the speeds of the wheels on the left and the ratio of the speeds of the wheels on the right, means for deriving and storing the difference between these ratios, means for comparing the current difference with the previously stored difference and means for issuing an alarm to the driver that the road surface may have varying frictional characteristics in the event that the absolute value of the comparison between the differences exceeds a predetermined value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further aspects of the Invention will become apparent from the following description by way of example only of an embodiment in conjunction with the following drawings in which.

DESCRIPTION OF THE PREFERRED EMBODIMENTS

Figure 1:
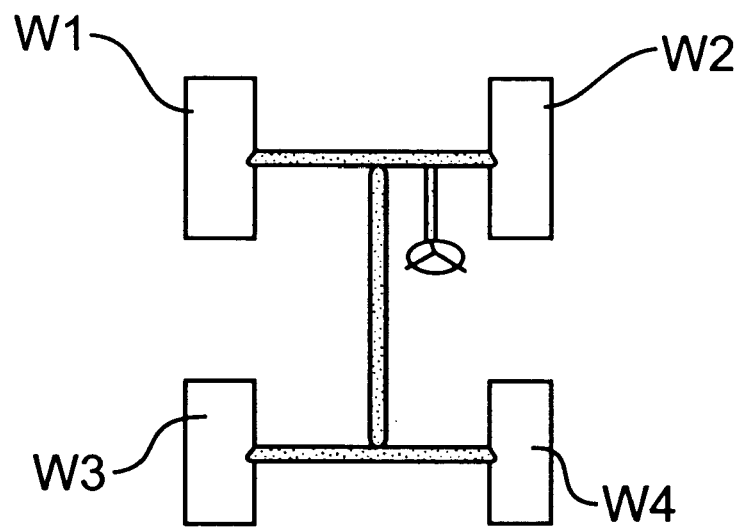
FIG. 1 shows a schematic diagram of a four wheeled vehicle.

Shown in FIG. 1 is a schematic diagram of a vehicle having a left side front wheel W1 and a right side front wheel W2 provided at either end of a front steering axle and a left side rear wheel W3 and right side rear wheel W4 at either end of a rear axle.

In accordance with the invention each of the wheels W1–W4 is provided with a wheel speed sensor (not shown) which provides an output signal respectively having a magnitude proportional to the speed of the wheel.

Figure 2:
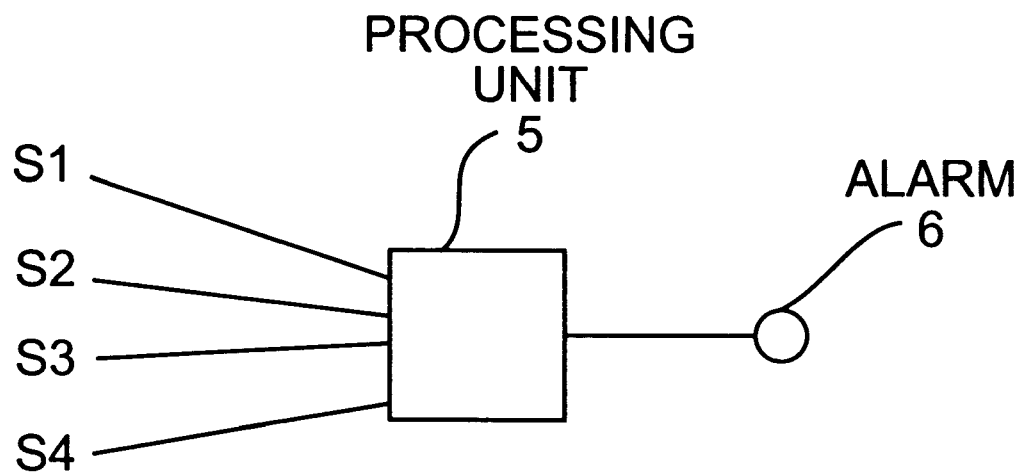
FIG. 2 shows a schematic diagram of an apparatus according to the present invention.

According to the invention the wheel speeds are repeatedly sampled and four wheel speed values S1–S4, representing the instantaneous speed of the four wheels W1–W4 respectively, are taken to an arithmetic processing unit 5 as shown in FIG. 2. Using the speed values the arithmetic processing unit 5 calculates the ratio of the speeds of the wheels on the left of the vehicle and similarly the ratio of those on the right. In a preferred embodiment the system calculates the ratios RL and RR of the front to rear wheels, i.e. RL=S1/S3 and RR=S2/S4. The arithmetic processing unit then derives the difference DIFF between the two ratios, i.e. DIFF=RL−RR or DIFF=RR−RL, and then stores this current value.

The whole procedure of sampling the wheel speeds, calculating the ratios of left and right wheel speed values, deriving the difference between left and right ratios and storing this new difference value is then repeated.

According to the invention the most recent difference value is compared with the previously stored difference value and in the event that the absolute magnitude of this difference DELDIFF between the differences DIFF exceeds a predetermined value TRIG the system instructs an alarm to be issued by an alarm unit 6. Thus the driver of the vehicle is alerted that the wheels on either side of the vehicle may be running on surfaces of differing frictional characteristics.

In a preferred embodiment of the invention the predetermined value TRIG lies in the range 0.001 to 0.01, and most preferably the value is 0.0035. This value has been shown to provide a warning to the driver of many different road surface conditions including shallow surface water.

It has been found that if the value of TRIG used is less than 0.001 then the system warns unnecessarily whereas if a value in excess of 0.01 is used then dangerous road conditions are overlooked.

Whether or not an alarm is issued, the system of the invention continues to repeat the above procedure replacing the previously stored DIFF value with the newly derived value in readiness for the next comparison.

Whilst the above described procedure may be repeated with varying frequency is preferable that it is repeated regularly. It is preferable that it is repeated at least every second.

According to the above described embodiment the present invention provides a method and apparatus capable of warning a driver that the wheels on either side of the vehicle are running on surfaces having different frictional characteristics which constitute a potentially dangerous road surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described my invention what I claim is:

1. A method of warning a vehicle driver when the vehicle may be driving on a potentially hazardous road surface, the vehicle having a wheel or wheels at front left and right and rear left and right positions on the vehicle, comprising repeating the steps of measuring the instantaneous speed of the wheel or wheels at each of the four positions, calculating the ratio of the speeds of the wheels on the left and the ratio of the speeds of the wheels on the right and deriving and storing the difference between these ratios, comparing the current difference with the previously stored difference and in the event that the absolute value of the comparison between the differences exceeds a predetermined value issuing an alarm to the driver that the road surface may have varying frictional characteristics.

2. A method according to claim 1 wherein the steps of measuring, calculating, deriving, storing and comparing are repeated at least every second.

3. A method according to claim 1 wherein the steps of measuring, calculating, deriving, storing and comparing are repeated at a constant frequency.

4. A method according to claim 1 wherein the wheel speeds are measured by means of signals provided by pulse generators provided at each wheel.

5. A method according to claim 1 comprising deriving the ratios of speeds of the front wheels to the rear wheels on the left and right of the vehicle.

6. A method according to claim 1 wherein the predetermined value is in the range 0.001 to 0.01.

7. A method according to claim 1 wherein the predetermined value is 0.0035.

8. An apparatus for warning a vehicle driver when the vehicle may be driving on a potentially hazardous road surface, the vehicle having a wheel or wheels at front left and right and rear left and right positions on the vehicle, comprising means for measuring the instantaneous speed of the wheel or wheels at each of the four positions, means for calculating the ratio of the speeds of the wheels on the left and the ratio of the speeds of the wheels on the right, means for deriving and storing the difference between these ratios, means for comparing the current difference with the previously stored difference and means for issuing an alarm to the driver that the road surface may have varying frictional characteristics in the event that the absolute value of the comparison between the differences exceeds a predetermined value.

* * * * *